Patented Sept. 3, 1946

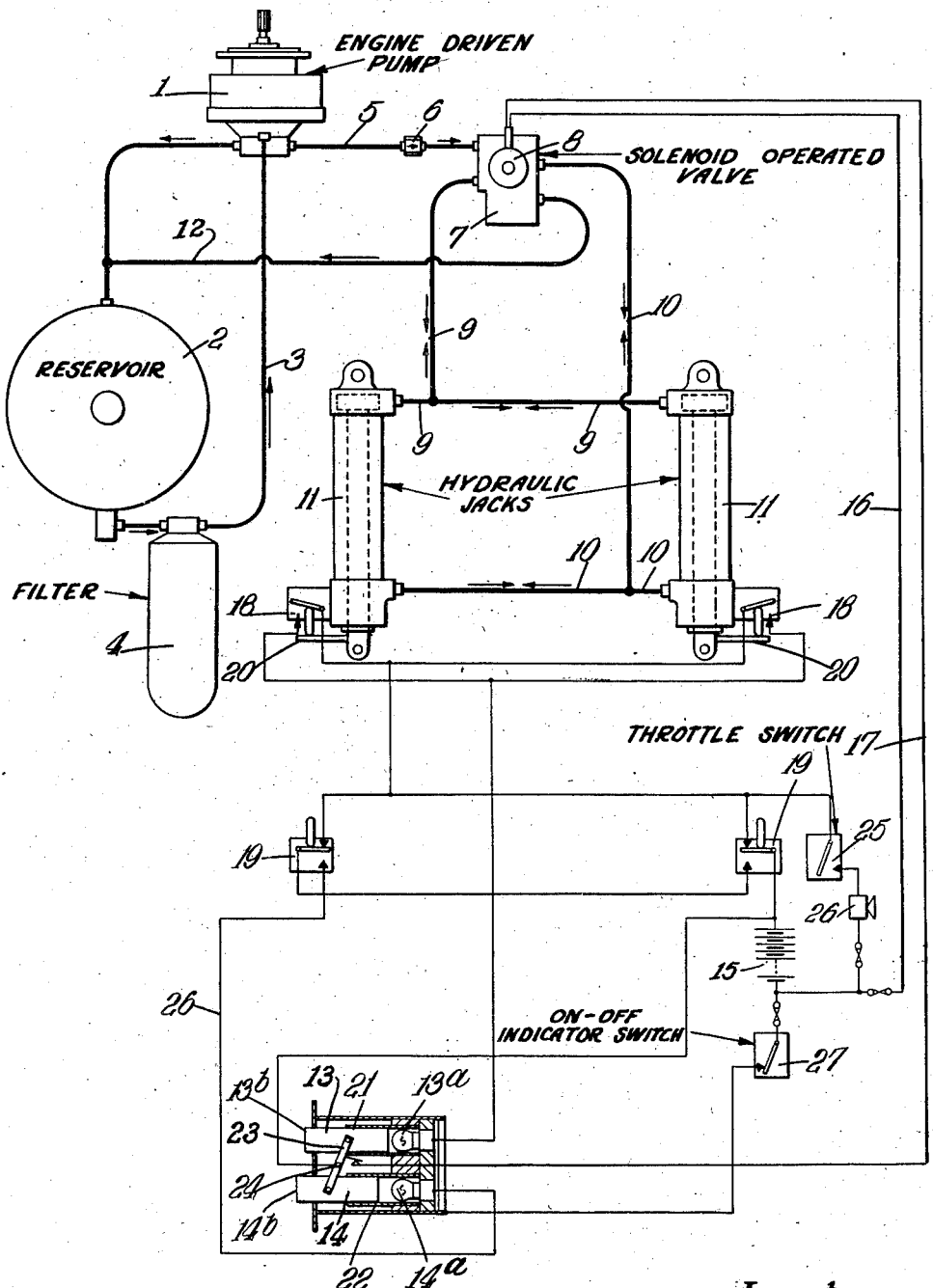

2,407,018

UNITED STATES PATENT OFFICE 2,407,018

FLUID-ACTUATED CONTROL SYSTEM

Donald MacKenzie, Cheltenham, England, assignor to Dowty Equipment Limited, Cheltenham, England Application June 30, 1941, Serial No. 400,539
In Great Britain October 15, 1940

9 Claims. (Cl. 177—311)

1

The present invention relates to remote control systems.

Though primarily intended for use in hydraulic control systems for aircraft as employ double-acting hydraulic jacks for such operations as raising and/or lowering alighting gear, flap control, controlling airscrew pitch, operation of gun turrets, bomb-racks, retractable radiators, et cetera, it is conceivable that the invention may also have useful application to any control system in which a valve or equivalent actuating member associated with a device to be actuated needs to be controlled from some remote point.

It is an object of the present invention to provide an improved fluid actuated remotely controlled system in which the jacks are controlled for operation electrically in both senses by means of press-button switches. Electrical control of the jacks has the advantage that in many cases, particularly in aircraft structures, the lay-out of the system can be very considerably simplified owing to the fact that the hydraulic elements of the circuit, pipe lines, etc., can be localized in the structure and wires run off to one or more remote control stations thereby making it unnecessary to run the fluid conduits of the system back to control valves accessible to the pilot.

It is a further object of the invention to provide a satisfactory light-weight fluid pressure remote control circuit in which the fluid conduits and the associated fluid circuit is kept as simple as possible and in which the means for actuating the system electrically can serve also as means for indicating the positions of the controlled elements (i. e., whether, for instance, an undercarriage is fully retracted or fully locked down and thereby set for landing). In preferred constructions, signal lights are provided in or associated with press-buttons for actuating the circuit.

In some cases the valve or equivalent means by which the receivers are actuated may be carried directly by the receivers so that each controlled unit may be regarded virtually as an installation complete in itself ready for connection to the circuit.

It will be evident that placing the control valves at convenient remote points in the system may result in considerable simplification on account of the fact that it then becomes no longer necessary to bring numerous flow and return lines to a series of valves at the control station; all that is required is electrical connection between the control station (the pilot's cockpit in the case of aircraft) and each valve, in which case no part of the actual fluid system need come into the control station. The electrical connection between the control station and the valve or equivalent member to be actuated may involve readily detachable plug connections to facilitate removal and servicing, and where the system is complicated, provision may be made to prevent inadvertent or incorrect connection on reassembly. Provisions to these ends being well-known, their illustration has been omitted.

In order that it may be clearly understood and readily carried into effect, the invention is hereinafter described with reference to the accompanying diagrammatic drawing, which illustrates a fluid pressure remote control system according to the invention operable by electrical means for effecting retraction and extension of undercarriage jacks.

Referring now to the drawing, the engine-driven pump 1 draws actuating fluid from the reservoir 2 along the conduit 3, preferably including the filter 4. From the outlet of the pump the conduit 5 feeds through the non-return valve 6 to the electrically-controlled valve 7. The valve 7 is preferably of the kind described in my co-pending United States application Serial No. 398,674, filed June 18, 1941 (see Figure 2 thereof), and is controlled electrically by the solenoid 8, but any convenient form of electrical control valve can be used which can be operated selectively to establish the required communication to the conduits 9 and 10, flow through which operates the jacks 11 for extension and retraction, respectively. The jacks in this case are operatively connected with the undercarriage for controlling its movement in retraction and extension. When pressure flow is through either conduit 9 or 10, as the case may be, return flow is back through the other, through the body of the valve 7, and along the return conduit 12.

In the arrangement shown the solenoid has two limit positions one of which it assumes under spring-loading when de-energised to place the conduit 9 in communication with the pressure conduit 5 from the pump 1 for extension of the jacks 11. When energised the solenoid moves to its other extreme position to establish communication between the conduit 5 and the line 10 for retraction of the jacks.

The solenoid 8 is energisable and de-energisable by means of press-buttons 13 and 14 coupled together to ensure that one is out when the other is in. Pressure on the button 13 connects the solenoid to the battery 15 through the leads 16 and 17 for energisation, and pressure upon the other button 14 breaks the circuit and leaves the solenoid de-energised.

A preferred arrangement of the press-buttons 13 and 14 in the circuit is illustrated, which enables the press-buttons to serve as indicator means to show the pilot when the undercarriage is properly set for landing. Accordingly, the plunger-actuated up switches 18 and down switches 19 are operated respectively when the undercarriage is locked in the fully-up and fully-down positions, the plungers of the switches being engaged by the switch-actuating arms 20. The plungers of the switches 18 and 19 are spring-urged so as normally to project, but are pressed in by the switch-actuating arms 20. The press-buttons 13 and 14 include indicator lights 13a and 14a appropriately illuminated according to the operation involved. The press-buttons are therefore formed hollow, having translucent end panels 13b and 14b, respectively, of which the panel 13b is red and 14b green. The press-buttons 13 and 14 slide in tubular guides 21 and 22, respectively, and are connected by the link 23, swinging about the fixed pivot 24.

Let it be assumed that the indications required to be given are essentially a green light signal through the press-button 14 when the undercarriage is locked in the down position and (when extension operation has been initiated) a red light signal persisting until the undercarriage reaches that condition. If now the undercarriage jacks 11 are retracted with the aircraft in flight, the arrangement is as drawn with the press-button 13 in. The solenoid 8 is energised and no lights are visible, for the circuit through 13a is open at 18. To lower the undercarriage, the press-button 14 is pressed in, with the result that the solenoid 8 is de-energised and pressure fluid flows through the valve 7, along the conduit 9 to extend the jacks 11. Immediately the up switches 18 are released and closed as the actuating arms 20 free the up switch plungers, and a red light appears inside the now-projected press-button 13. When the undercarriage jacks reach the fully-extended condition, the undercarriage is locked in the extended position and the double-throw down switches 19 are reversed in position by the arms 20, so that the red light 13a is extinguished, and the green light 14a is illuminated inside the press-button 14. The throttle switch 25 is actuated by the throttle lever and operates to sound a buzzer 26 if the throttle is more than two-thirds closed when the undercarriage is not locked in the extended position ready for landing. The switch 27 is merely an "on-and-off" switch so that the indicator lights can be turned off when the indicator is not required.

To retract the undercarriage from the extended condition, the press-button 13 is pushed in (thereby projecting the press-button 14), with the result that the solenoid 8 is energised and oil passes through the control valve 7 and through the conduit 10 to retract the jacks 11; return oil flowing from the jacks, along the conduit 9, back to the reservoir via conduit 12. Immediately the down switches 19 are released and reversed, the green light is extinguished and a red light appears at the button 13, but when both jacks 11 are fully retracted, the undercarriage is locked in the retracted position and the switches 18 open to extinguish the red light.

What I claim is:

1. Control means for an operating system incorporating two cooperating jacks and jack operating means, comprising means operable to control simultaneous movement of both jacks, terminal position indicator means, means operable only by movement of both jacks into a terminal position to energize said terminal position indicator means, intermediate position indicator means, means operable during such time as either jack is in a position intermediate its fully extended position and its fully retracted position to operate said intermediate position indicator means, and means operable by movement of both jacks into terminal positions to deenergize said intermediate position indicator means.

2. Control means for a pressure system incorporating two cooperating double-acting hydraulic jacks, and a source of fluid under pressure, comprising means operable to control flow of fluid under pressure to move both jacks, terminal position indicator means, means operable only by movement of both jacks to the same terminal position to energize said terminal position indicator means, intermediate position indicator means, means operable prior to both jacks reaching the same terminal position to operate said intermediate position indicator means, and means operable by movement of both jacks into corresponding terminal positions to deenergize said intermediate position indicator means.

3. Control means for a pressure system incorporating two cooperating double-acting jacks and a source of fluid under pressure, comprising means operable in one direction to control simultaneous flow of fluid under pressure to extend both jacks, and operable in the opposite direction to control the flow of fluid from said fluid supply source to retract both jacks, jack-extended indicator means, means operable only by movement of both jacks into fully extended position to energize said jack-extended indicator means, intermediate position indicator means, means operable during such time as either jack is in other than its fully extended position, whether in its fully retracted position or intermediate its fully extended position and its fully retracted position, to operate said intermediate position indicator means, means operable by movement of both jacks into their fully extended positions to deenergize said intermediate position indicator means, and means operable by movement of both jacks into their fully retracted positions to deenergize said intermediate position indicator means.

4. Control means for an operating system incorporating two cooperating jacks and jack operating means, comprising means operable to control simultaneous movement of both jacks, intermediate position indicator means, means operable during such time as either jack is in a position intermediate its fully extended position and its fully retracted position to operate said intermediate position indicator means, and means operable by movement of both jacks into terminal positions to deenergize said intermediate position indicator means.

5. Control means for an operating system incorporating two or more cooperating jacks, and jack-operating means, comprising means operable to effect substantially simultaneous movement in the same sense of both jacks, an intermediate-position indicator, an extended-position indicator, and a control system for said indicators including a first control arranged for operation by each jack upon departure from retracted position to energize the intermediate-position indicator, a second two-position control arranged for operation by each jack upon arrival at or departure from fully extended position, at least one of said second controls being interposed between the first controls and the intermediate-position indicator, and in the normal position corresponding to departure from fully extended position operatively connecting said first controls to their indicator, said second controls, in their positions corresponding to fully extended position, being connected in series to prevent deenergization of the intermediate-position indicator prior to arrival of all jacks in fully extended position.

6. Position indicating means for an operating system which incorporates two or more cooperating jacks or like prime movers, and means to effect substantially simultaneous movement of all jacks between an operative and an inoperative terminal position; said position-indicating means comprising a first indicator which indicates arrival of the jacks in the operative terminal position, and a second indicator which indicates disposition of any jack, or all, in any position intermediate the two terminal positions; means responsive to departure of any jack, or all, from inoperative terminal position to energize said second or intermediate-position indicator; means responsive to arrival of all jacks at the operative terminal position to deenergize said intermediate-position indicator; and further means responsive to arrival of all jacks at the operative terminal position to energize said first or operative-position indicator.

7. Position-indicating means for an operating system which incorporates two or more cooperating jacks or like prime movers, and means to effect substantially simultaneous movement of all jacks between an extended and a retracted position; said position-indicating means comprising a first indicator which indicates arrival of the jacks in the extended position, and a second indicator which indicates disposition of any jack, or all, in any position intermediate the extended and retracted positions; means responsive to departure of any jack, or all, from retracted position to energize said second or intermediate-position indicator; means responsive to arrival of all jacks at the extended position to deenergize said intermediate-position indicator, and responsive to departure therefrom of any jack to reenergize said intermediate-position indicator; and further means responsive to arrival of all jacks at the extended position to energize said first or extended-position indicator, and further responsive to reenergization of the intermediate-position indicator upon departure of any jack from extended position, to thereby deenergize said extended-position indicator.

8. Position indicating means for an operating system which incorporates two or more cooperating jacks or like prime movers, and means to effect substantially simultaneous movement of all jacks between an extended and a retracted position; said position-indicating means comprising a first indicator which indicates arrival of the jacks in the extended position, and a second indicator which indicates disposition of any jack, or all, in any position intermediate the extended and retracted positions; means responsive to departure of any jack, or all, from retracted position to energize said second or intermediate-position indicator, and further responsive to return of all jacks to retracted position to deenergize said intermediate-position indicator; means responsive to arrival of all jacks at the extended position to deenergize said intermediate-position indicator, and to energize said first or extended-position indicator.

9. Position indicating means for an operating system which incorporates two or more cooperating jacks or like prime movers, and means to effect substantially simultaneous movement of all jacks between an extended and a retracted position; said position-indicating means comprising a first indicator which indicates arrival of the jacks in the extended position, and a second indicator which indicates disposition of any jack, or all, in any position intermediate the extended end retracted positions; means responsive to departure of any jack, or all, from retracted position to energize said second or intermediate-position indicator, and further responsive to return of all jacks to retracted position to deenergize said intermediate-position indicator; means responsive to arrival of all jacks at the extended position to deenergize said intermediate-position indicator, and to energize said first or extended-position indicator, said latter means including a line common to the two indicators, and alternatively operable switch means therein, to enable energization of one or the other indicator, according to the disposition of the jacks in or out of extended position, but never both such indicators.

DONALD MacKENZIE.